(12) United States Patent
Kocho et al.

(10) Patent No.: US 8,266,282 B2
(45) Date of Patent: Sep. 11, 2012

(54) SYSTEM AND METHOD FOR ENFORCING ADVERTISING POLICIES USING DIGITAL RIGHTS MANAGEMENT

(75) Inventors: Keith Kocho, Scarborough (CA); Erik Davis, Toronto (CA); Brian Stevenson, Whitby (CA)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 13/049,211

(22) Filed: Mar. 16, 2011

(65) Prior Publication Data

US 2011/0166945 A1 Jul. 7, 2011

Related U.S. Application Data

(63) Continuation of application No. 11/320,795, filed on Dec. 30, 2005, now Pat. No. 7,925,739.

(51) Int. Cl.
*G06F 15/173* (2006.01)
*G06F 15/16* (2006.01)

(52) U.S. Cl. ........ 709/224; 709/203; 709/217; 709/223; 705/14.1; 705/14.4

(58) Field of Classification Search .......... 709/201–203, 709/217–219, 223–224; 705/14.4–14.41, 705/14.1, 14.22
See application file for complete search history.

(56) References Cited

U.S. PATENT DOCUMENTS

| | | | |
|---|---|---|---|
| 7,062,468 B2 | 6/2006 | Hillegass et al. | |
| 7,171,558 B1 | 1/2007 | Mourad et al. | |
| 7,188,085 B2 * | 3/2007 | Pelletier | 705/14.1 |
| 7,188,137 B2 * | 3/2007 | Inoue et al. | 709/203 |
| 7,430,724 B2 | 9/2008 | Othmer | |
| 7,630,986 B1 * | 12/2009 | Herz et al. | 709/217 |
| 2002/0095473 A1 | 7/2002 | Berkowitz et al. | |

(Continued)

FOREIGN PATENT DOCUMENTS

JP 2001125952 A 5/2001

(Continued)

OTHER PUBLICATIONS

PCT "International Preliminary Report on Patentability dated Jan. 13, 2009 (1 page), Notification of Transmittal of International Search Report and the Written Opinion of the International Searching Authority, or the Declaration and International Search Report dated Dec. 5, 2008 (4 pages)," for PCT International Application PCT/US2006/045596.

(Continued)

*Primary Examiner* — Bharat N Barot
(74) *Attorney, Agent, or Firm* — Patent Capital Group

(57) ABSTRACT

A system and method for policy-based advertising. According to an embodiment, an advertisement server receives a request for advertising content from a user computer over a network, the advertising content associated with an advertising policy specifying one or more usage conditions to be met by a user of the user computer in connection with the advertising content in order for the user to qualify for a promotional consideration, provides to the user computer over the network, in response to the request for the advertising content, the advertising content and one or more constraints to be enforced by a content player on the user computer in accordance with the advertising policy, receives from the user computer metering data reflecting usage of the advertising content on the user computer, and determines whether the one or more advertising policy usage conditions have been met based on the received metering data.

20 Claims, 8 Drawing Sheets

U.S. PATENT DOCUMENTS

| | | | |
|---|---|---|---|
| 2003/0131095 A1* | 7/2003 | Kumhyr et al. | 709/224 |
| 2004/0010546 A1* | 1/2004 | Klug et al. | 709/203 |
| 2004/0148424 A1 | 7/2004 | Berkson et al. | |
| 2005/0144074 A1 | 6/2005 | Fredregill et al. | |
| 2005/0283791 A1 | 12/2005 | McCarthy et al. | |
| 2006/0041470 A1* | 2/2006 | Filho et al. | 705/14 |
| 2007/0150355 A1* | 6/2007 | Meggs | 705/14 |
| 2007/0156838 A1 | 7/2007 | Kocho et al. | |
| 2008/0319857 A1* | 12/2008 | Dobbins et al. | 709/203 |
| 2011/0213869 A1* | 9/2011 | Korsunsky et al. | 709/223 |

FOREIGN PATENT DOCUMENTS

| | | | |
|---|---|---|---|
| JP | 2002281483 A | 9/2002 | |
| JP | 2002354449 A | 12/2002 | |
| JP | 2003122787 A | 4/2003 | |
| JP | 2003208541 A | 7/2003 | |
| JP | 2004078514 A | 3/2004 | |
| WO | WO 2007/078474 | 7/2007 | |

OTHER PUBLICATIONS

EPO Communication dated Jun. 29, 2010 (1 page), Supplementary European Search Report and European Search Report dated Jun. 29, 2010 (4 pages) for EP 06838514.5.

Response to Jun. 29, 2010 EPO Communication, EP Application No. 06838514.5, 12 pages.

Apr. 2, 2009 Non-Final Office Action, U.S. Appl. No. 11/320,795, 11 pages.

Response to Apr. 2, 2009 Non-Final Office Action, U.S. Appl. No. 11/320,795, 9 pages.

Sep. 17, 2009 Final Action, U.S. Appl. No. 11/320,795, 11 pages.

Feb. 4, 2010 Advisory Action, U.S. Appl. No. 11/320,795, 3 pages.

Request for Continued Examination to Sep. 17, 2009 Final Action, U.S. Appl. No. 11/320,795, 11 pages.

JPO Nov. 11, 2011 Notice of Refusal Reason (English translation included) from Japanese Application No. JP2008-548521; 4 pages.

May 27, 2011 IP Australia Examiner's First Report on AU Patent Application No. 2006333468; 2 pages.

AU—Mar. 28, 2012 Response to May 27, 2011 IP AU Examiner's First Report filed on AU Patent Application No. 2006333468; 18 pages.

AU Apr. 3, 2012 Notice of Acceptance for AU Application No. 132006333468; 3 pages.

* cited by examiner

SYSTEM AND METHOD FOR ENFORCING ADVERTISING POLICIES USING DIGITAL RIGHTS MANAGEMENT

RELATED APPLICATION

This Application is a continuation(and claims the benefit of priority under 35 U.S.C. §120) of U.S. application Ser. No. 11/320,795, filed Dec. 30, 2005 now U.S. Pat. No. 7,925,739, entitled "SYSTEM AND METHOD FOR ENFORCING ADVERTISING POLICIES USING DIGITAL RIGHTS MANAGEMENT,"Inventor(s) Keith Kocho, et al. The disclosure of the prior application is considered part of(and is incorporated by reference in) the disclosure of the application.

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office patent file or records, but otherwise reserves all copyright rights whatsoever.

BACKGROUND OF THE INVENTION

As the Internet continues to grow in size and popularity, online advertisers are continually seeking new ways to attract the attention of the online audience. Over the years technology of online advertising has progressed from simple banner ads that passively appear on Web pages to interstitials ads that pop-up in separate browser windows to rich media ads that provide streaming video to Web browsers in what amounts to online television commercials.

Due to the increasing expense and competition for ad space associated with online advertising, it is becoming more important for advertisers to know with a high degree of certainty that their ads are effective in reaching their target audience, and that the ads are not simply or easily ignored. To this end, for example, some content providers (such as news Web sites) package advertising video content with news video clips in the hope that when a user clicks on a news video clip link, the user's browser or content player (e.g., Windows Media Player, QuickTime Player, etc.) will force the user to watch the advertising video content—and not skip over it or fast forward through it—before gaining access to the desired news clip. This packaged advertising video content is commonly referred to as a "must watch" segment.

However, such advertising solutions fails to ensure that the user actually views the advertisement content as intended. Tools exists that allow users to buffer incoming video streams and fast forward through them, which defeats the purpose of the packaged advertising video content. Current online advertising solutions do not provide a high degree of certainty that their ads are effectively consumed by the user because they fail to effectively track and manage the ad after it is provided to the user over the Internet.

Accordingly, there is a need in the art for a system and method that effectively tracks and manages advertising content after it is provided to a user for consumption.

DETAILED DESCRIPTION

The present invention addresses the deficiencies of current solutions by utilizing digital rights management technology to enforce advertising policies associated with online advertising content. In other words, once advertising content is provided to a user over the Internet, digital rights management technology associated with the user's content player (whether stand-alone or via a Web browser) is utilized to ensure that the advertising content is consumed by the user in the manner specified by the advertiser.

Figure 1:
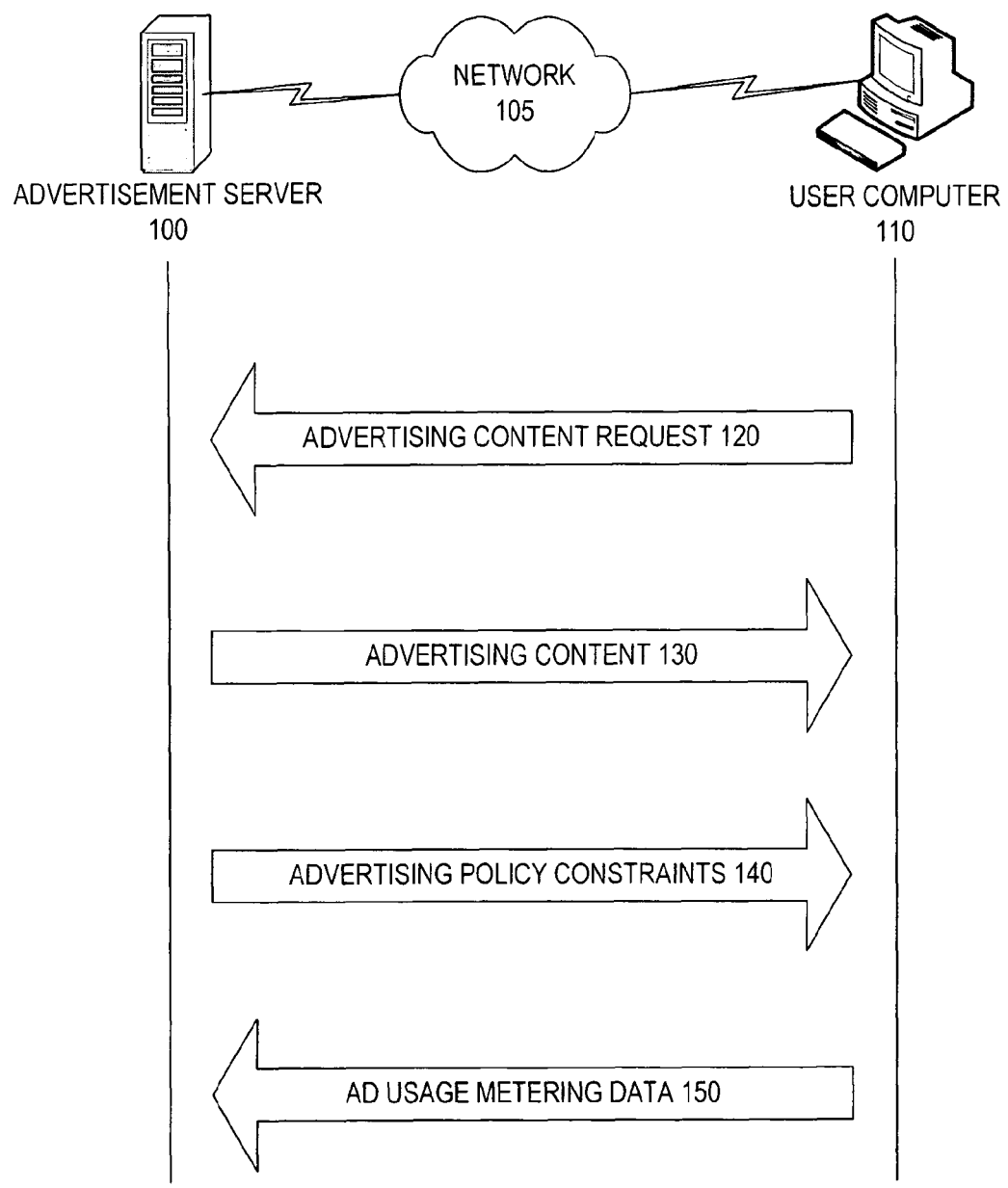
FIG. 1 is a block diagram that depicts a data flow between an advertisement server and user computer in accordance with an embodiment of the present invention.

This is shown in FIG. 1 in the context of an incentive-based advertising embodiment of the present invention. In this embodiment, advertisement server 100 provides offers to online users for promotional consideration (e.g., incentives, such as coupons or discounts) in return for the user consuming particular advertising content. These offers may be provided to users over network 105, such as via an electronic marketplace (i.e., Web site) on the Internet, for example.

Once a user of user computer 110 sees a desirable offer, the user clicks on the offer causing user computer 110 to send a request (120) for the advertising content associated with the offer. Since the advertising content is associated with an advertising policy specifying usage conditions to be met by the user in connection with the advertising content (e.g., that the user watch or interact with the content for a predetermined amount of time or predetermined number of times etc.), advertisement server 100 provides user computer 110 both the advertising content 130 and one or more constraints 140 to be enforced by a content player on user computer 110 in accordance with the advertising policy.

As the user consumes the advertising content on user computer 110, advertisement server 100 receives metering data 150 from the content player on user computer 110 which reflects the user's usage of the advertising content on user computer 110. Based on this metering data, advertisement server 100 is able to determine with a high degree of confidence whether one or more of the advertising policy usage conditions have been met. If they have been met, advertisement server 100 may then provide the user with the agreed upon promotional consideration.

The digital rights technology utilized in this embodiment may be based on either a proprietary or a third-party solution, and may or may not include encrypting the advertising content for delivery to user computer 110. If encryption is utilized, then advertisement server 100 may subsequently provide a key to user computer 110 so that the content player may unlock the encrypted advertising content in order to present it to the user. In some embodiments, the key and constraints may be provided together to user computer 110 in a software license.

In another embodiment, advertisement server 100 may push the advertising content to user computer 110 instead of first receiving an advertising content request (120). The advertising content may be selected for distribution to user computer 110 based on stored content preference information associated with the user (e.g., received by the user during a registration process, or by monitoring the user's online activity).

Figure 2:
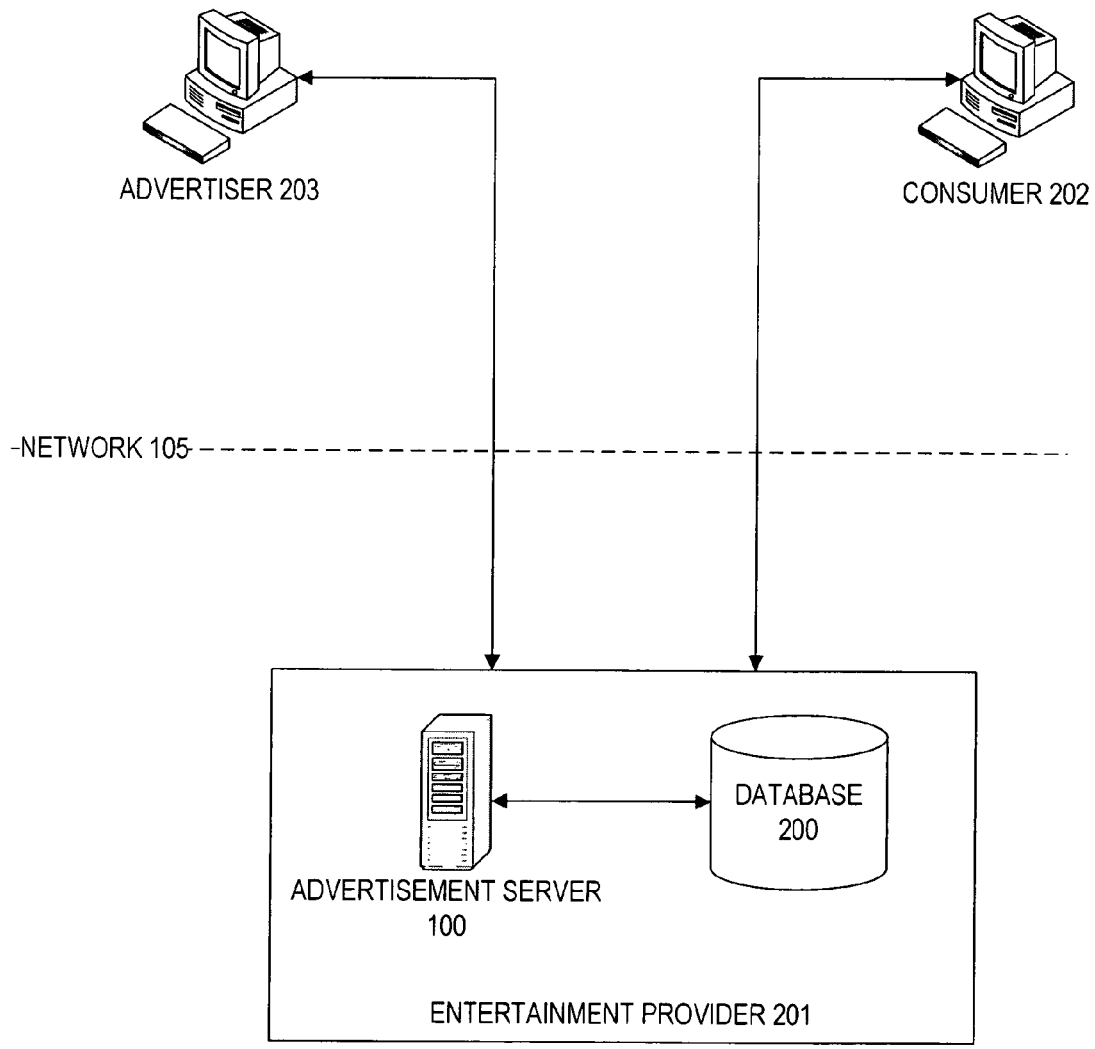
FIG. 2 is a block diagram that depicts a system architecture in accordance with an embodiment of the present invention.
Figure 3:
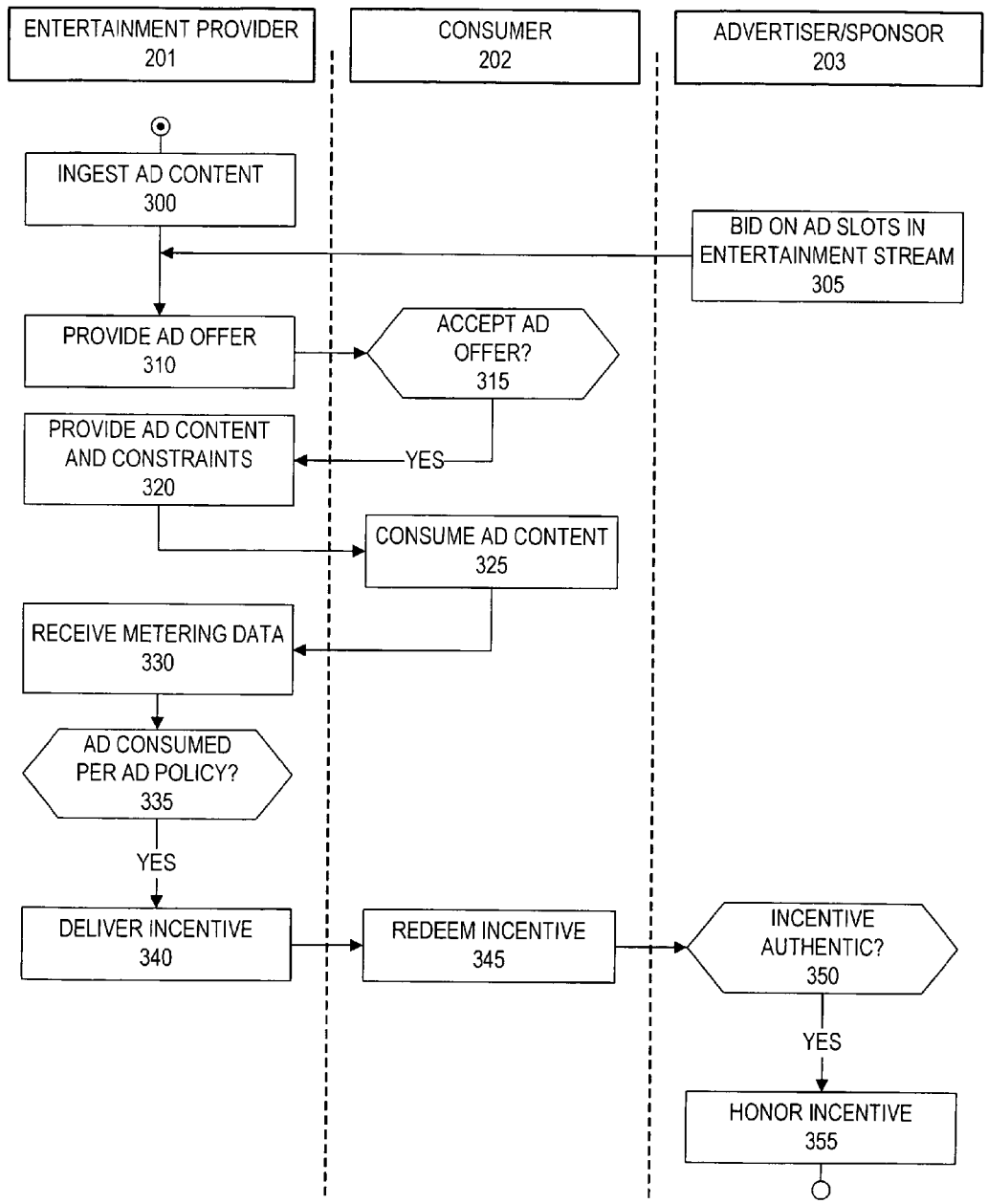
FIG. 3 is a process flow diagram for tracking and managing incentive-based advertisements in accordance with an embodiment of the present invention.
Figure 4:
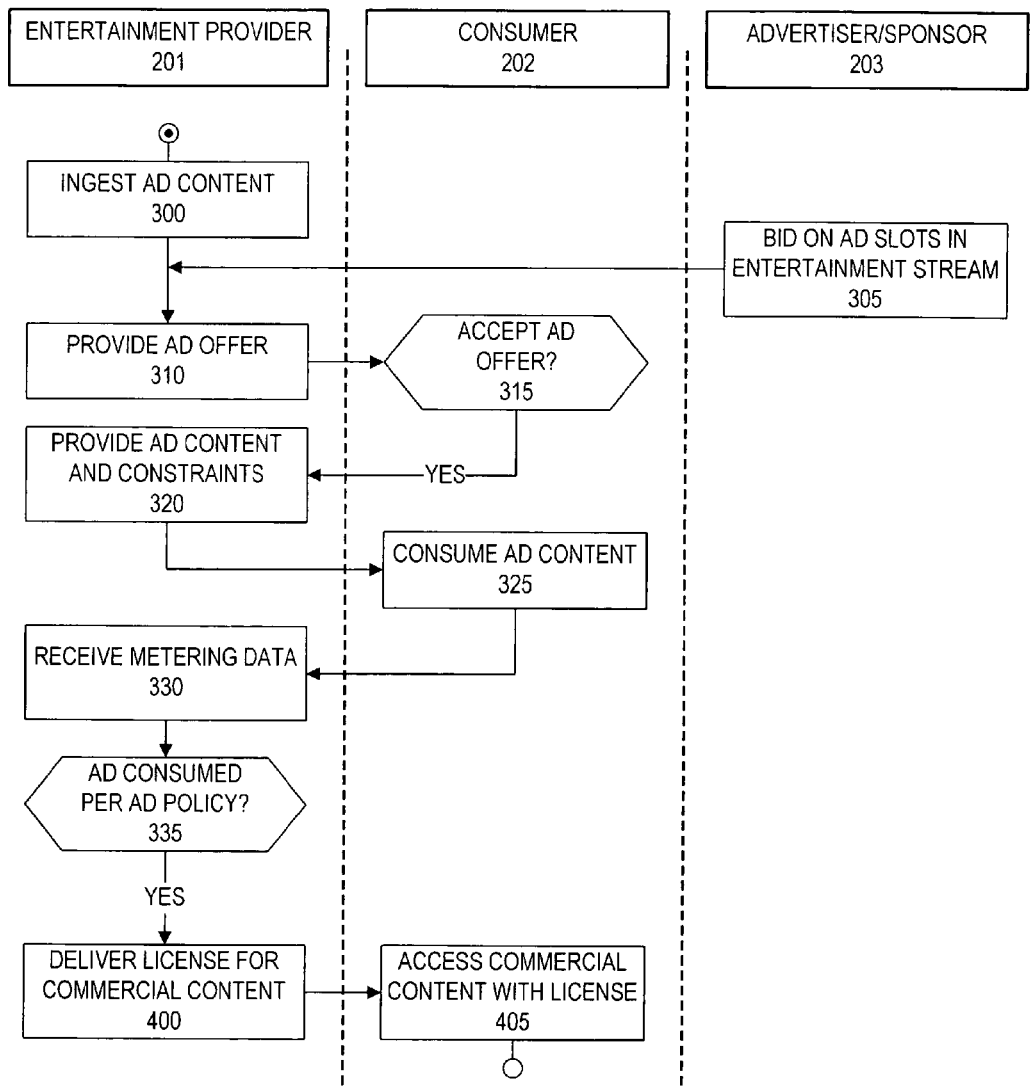
FIG. 4 is a process flow diagram for tracking and managing another type of incentive-based advertisements in accordance with an embodiment of the present invention.
Figure 5:
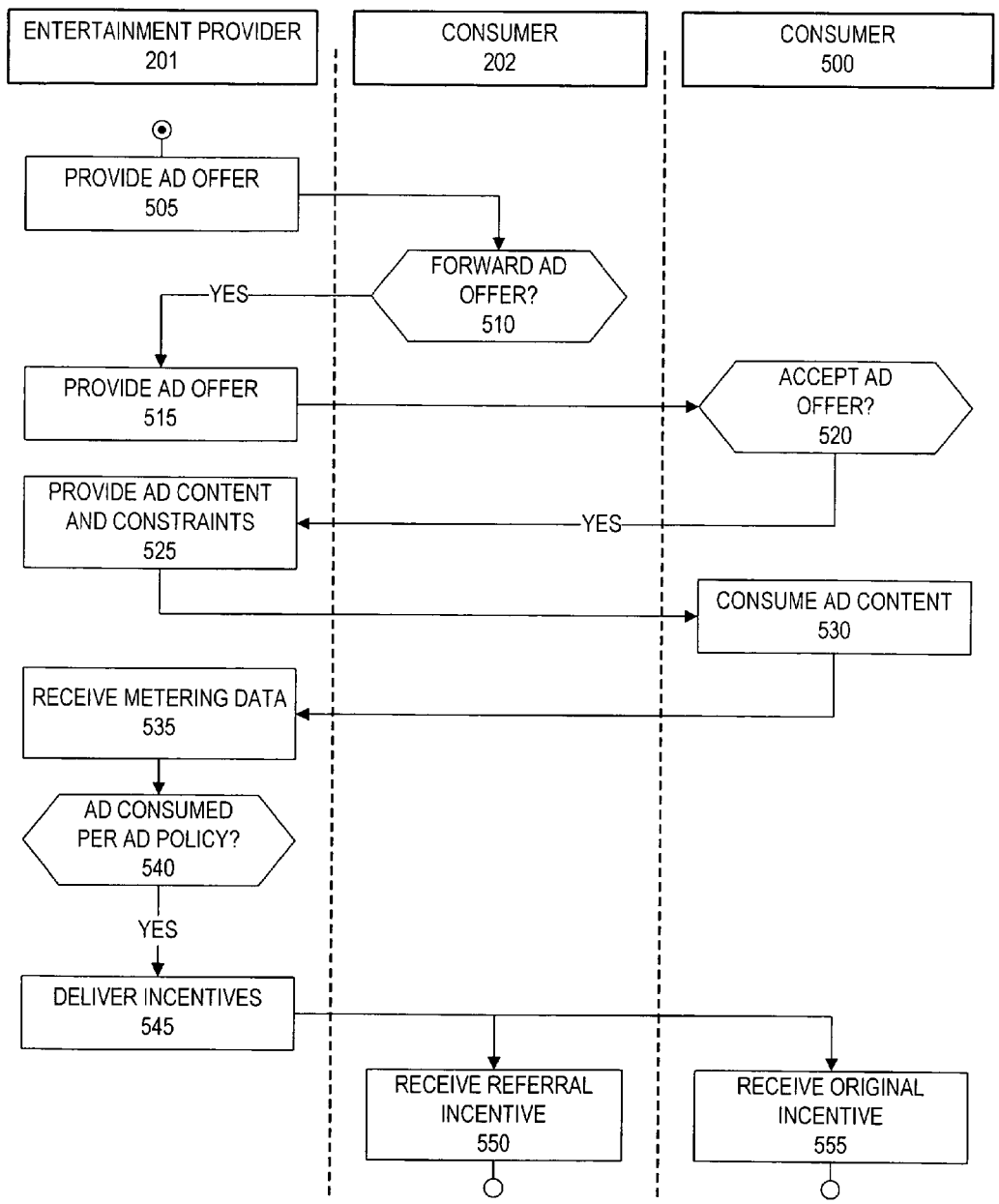
FIG. 5 is a process flow diagram for tracking and managing incentive-based advertisements via viral distribution in accordance with an embodiment of the present invention.

FIG. 2 shows an example system architecture that may implement embodiments of the invention as provided in FIGS. 3-5. The entertainment provider 201 may represent a supplier of content to end-users, such as consumer 202. Entertainment provider 201 may take any number of forms, such as a web server providing streaming or downloadable audio or video, a cable television station, or a news publisher that distributes packaged newscasts to consumers' cell phones, and it may host advertisement server 100 and database 200 (which may store advertising content). The content provided by the entertainment provider 201 may be referred to as the entertainment stream, whatever the form of the content.

Consumer 202 may represent any of the end-users of entertainment provider 201's services. For example, if entertainment provider 201 represents a cable television station, consumer 202 may represent a cable television viewer. Alternatively, if entertainment provider 201 represents a streaming or downloadable video provider on the Internet, consumer 202 may represent an Internet user connected to the provider.

Advertiser 203 may represent an entity that supplies advertisements to entertainment provider 201 to be integrated into the entertainment streams that entertainment provider 201 supplies. The entertainment stream is provided to the consumer 202 over a distribution network 105. The present invention is not dependent on a particular distribution network 105, rather the distribution network 105 may be a cable television system, the Internet, or any other system capable of transmitting data.

FIG. 2 depicts entities that are related to embodiments of the present invention and the relationships between them; the quantities and identities of the entities in FIG. 2 are supplied as an example for illustration only. There may be many different advertisers and consumers for any entertainment provider 201. Additionally, the many different functions of entertainment provider 201 may be performed by many different devices, entities and persons. For simplicity, FIG. 2 shows only a single entity representing each group.

FIG. 3 depicts the management and tracking of advertisements as an example process flow according to an embodiment of the invention. Three parties are depicted in this diagram, though that number is for purposes of this example and is not a limitation of the invention. In reality, the functions and relationships depicted in the diagram could be condensed or distributed over any number of parties.

In this example, the parties include entertainment provider 201, representing a party who provides entertainment streams to consumers, consumer 202, representing a party who has potential to purchase services or products, and advertiser 203, representing a party who wishes to conduct sales to consumers. The entertainment stream provided by entertainment provider 201 may be in a variety of forms, including an audio or video stream or file, a series of correspondence sent via e-mail, or a web site composed of various web pages for example. Whatever the form, the entertainment stream may include information of various types and advertisements.

The process depicted in FIG. 3 begins after advertiser 203 creates an advertisement and submits it to entertainment provider 201 for fulfillment or ingestion into the system (step 300). The advertisement may be an electronic file in one of many different formats. It may be a video file, a static image, an audio track, an executable application or of any other format in which a message could be conveyed. Entertainment provider 201 in this embodiment collects advertisements from advertisers in order to distribute the advertisements to consumers as part of an entertainment stream. An entertainment stream may be any delivery mechanism that allows the consumer to receive content and advertisements. In other embodiments, advertiser 203 may perform fulfillment or ingestion of the advertisement into entertainment provider 201's system via a portal or other user interface provided by entertainment provider 201.

When advertiser 203 submits an advertisement, it may also place a bid on advertising slots with an entertainment stream (step 305). This bid may be a direct purchase of advertising slots within the entertainment stream, such as a scheduled 30-second slot within a video stream or a certain space within a web page. The bid may also be an auction-style bid, comprising an acceptable sum that the advertiser will pay for the display of the advertisement. These are only examples of advertisement slots and not limitations of the current invention. The bidding process may also include other details related to the advertisement, such as a description of the audience targeted by the advertiser, time-of-day restrictions or other related items.

The fulfillment or ingestion stage may involve the application of a number of profiles to the advertisement, which may be facilitated by an administrator application. Profiles, in this embodiment, may be sets of commands or attributes to be applied to an advertisement. There may also be several sets of profiles. For example, there may be a set of profiles regarding the encoding process, in which an advertisement is modified from its original format and file to a different format and file that is acceptable for delivery in the particular entertainment streams (or for other purposes, such as storage). Another type of profile may regard the encryption of the advertisement, including the particular encryption algorithm to be applied, the parameters that should be used during the encryption and the forms and contents of licenses related to the advertisement. A third type of profile may include the advertising properties associated with the advertisement, including the bid price set by the advertiser, the rules for display or distribution, the targeted audience, or criteria that must be met before an advertisement is considered "viewed." This ad profile, combined with the auction and fulfillment framework and user metadata (e.g., content preference information provided by users during registration with a networked marketplace), enables targeted inventory delivery via a networked marketplace.

Figure 6:
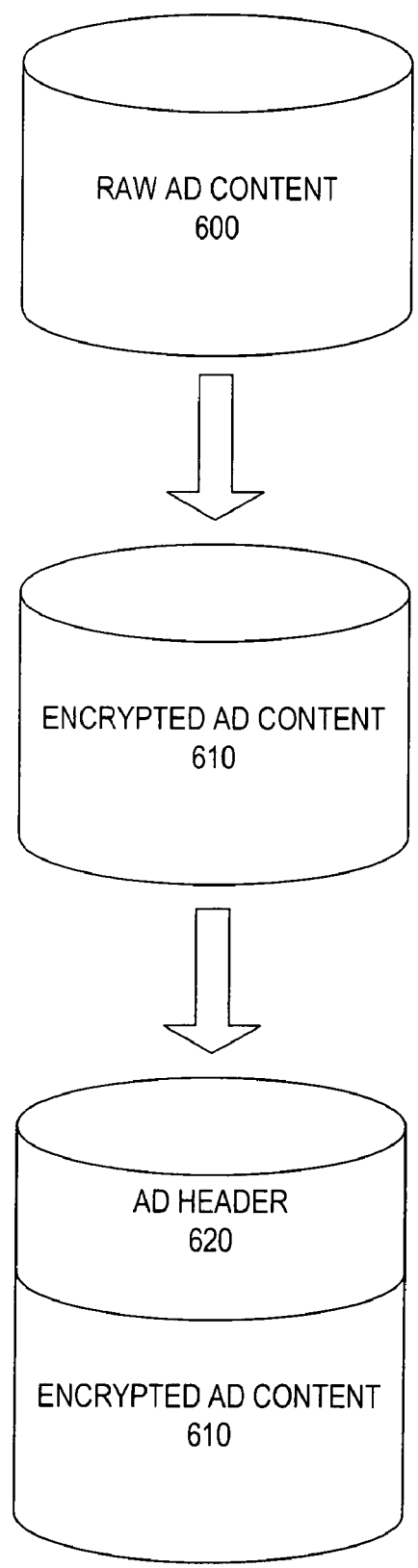
FIG. 6 is a block diagram that depicts advertising content ingestion in accordance with an embodiment of the present invention.

The application of the profiles may result in a new copy of the advertisement that is encrypted, as shown in FIG. 6. FIG. 6 illustrates how entertainment provider 201 may take the original ad 600, encrypt it (610), and add header information (620) such as a metering URL and license acquisition URL. The metering URL may be used by the content player at consumer 202's machine to report back to entertainment provider 201 and confirm that the user has fulfilled all the terms contained in an ad offer/policy. The license acquisition URL may be used to direct consumer 202 to entertainment provider 201 to acquire a license to unlock advertising content, in the event a license is not held by consumer 202 when access to the advertising content is attempted.

Once entertainment provider 201 has created an encrypted copy of the advertisement, it may extend an offer to consumer 202 for an incentive (such as a coupon or discount at an advertiser's Web site) in return for consumer 202 watching the advertisement (step 310). If consumer 202 accepts the offer (step 315), then entertainment provider 201 may distribute the advertisement to consumer 202 along with the profiled constraints on ad usage (step 320). This distribution may occur at a predetermined time (such as when the advertiser purchases a specific time slot) or on a dynamic, real-time basis (chosen from a pool of available advertisements when an entertainment stream reaches an advertising slot, for example).

Consumer 202 then receives the advertisement as part of an entertainment stream. If consumer 202 chooses not to engage the advertisement (either by viewing it, interacting with it or accepting its terms, depending on the particular advertisement format and contents), the entertainment stream may continue, but consumer 202 will not receive the incentive. In the embodiment of FIG. 3, this particular advertising transaction may then be ended. In other embodiments, the advertisement or entertainment stream may also create and submit metering data, as described below, to the entertainment provider 201, thereby allowing the tracking of rejection rates of certain advertisements or consumers 202.

If the consumer 202 chooses to engage the advertisement (step 325), the advertisement is presented to consumer 202 in whatever manner may be appropriate for the advertisement in question. Usually, the advertisement is presented via a content player located on consumer 202's system. The content player may then generate metering data reflecting consumer 202's behavior with the advertisement against the constraints set by the advertiser or entertainment provider. This data may include tracking data (such as which consumer has engaged the advertisement or the time and date of the activity), advertisement data (such as the details of the offer in the advertisement or the name of the advertiser associated with the advertisement) or any other data that may be useful to the entertainment provider or advertiser. Once the metering data is received by entertainment provider 201 (step 330), entertainment provider 201 may verify whether the advertisement obligations were fulfilled by consumer 202 based on the metering data (step 335), and if so, cause an incentive to be copied and delivered to the consumer 202 (step 340).

The incentive may be in many different formats, including text, HTML, video, static images (such as JPEG® or GIF® images or portable document formats) or encrypted executable files. The incentive is received by the consumer 202, who may then redeem it (step 345). The redemption process may vary by advertisement, incentive or advertiser. When the consumer 202 redeems the incentive with the advertiser, the advertiser may verify the incentive (step 350) to prevent counterfeiting, for example. If the incentive is successfully verified, the advertiser may then honor the incentive (step 355).

This process may be illustrated through the following example according to an embodiment of the invention. An online retailer wishes to promote a new DVD release of a children's movie. The retailer composes an advertisement for the DVD, containing short clips of the film and links to online reviews. The retailer then submits the advertisement to an online news provider, specifying that the advertisement should only be shown to adult members of a household with children and may be redeemed for a discount of 20% off the online retailer's normal price for the DVD. The news provider stores the advertisement in a database, inserting into streaming video at certain "advertisement points" for those users who are watching the video stream and whose profile matches the advertiser's requested demographic. Such a user may be presented with a choice to watch a short ad to receive savings on the DVD. The user chooses to watch the movie and is shown the advertisement. The user's content player attempts to verify that the user is actually watching the ad or that the advertisement has been viewed within the time frame set by the advertiser. Once the user has finished watching the advertisement, a message is sent to the news provider to indicate that the user has watched the advertisement. The news provider stores the metering data for use in marketing research (and to further understand the particular desires of that user). The news provider also creates, a one-use-only code that is sent to the user. Later, the user visits the online retailer's web site to purchase the DVD. During the checking out phase of the transaction, the user enters the one-use-only code into the provided form. Once the code has been verified, and thereafter invalidated, the retailer reduces the price on the bill by 20%, completing the transaction. This example is given only to demonstrate one particular case regarding one particular embodiment; nothing therein should be interpreted as a limitation on the invention.

Figure 7:
FIG. 7 is a screenshot that depicts an advertising offer in accordance with an embodiment of the present invention.

FIG. 7 illustrates yet another embodiment of the invention wherein a user has been targeted with an opt-in promotion for the Home Depot when purchasing Aladdin. The user has the option to get a $1.00 discount on a week's rental of the Aladdin product in return for watching one of 4 ads from the Home Depot. When entertainment provider 201 (i.e., Home Depot in this example) confirms that the ad was watched within the terms specified by the offer, the consumer is credited a $1.00. The consumer also has the option to strip the ad from the Aladdin content and forward the promotion to a friend, as discussed below. This embodiment is similar to that shown in FIG. 3, except entertainment provider 201 acts as both the advertiser and redeemer.

FIG. 4 depicts another example process flow that may result from an embodiment of the invention (as steps 300-335 are identical to the embodiment shown in FIG. 3, the newly discussed processing blocks are steps 400 and 405). The process flow depicted in FIG. 4 demonstrates an embodiment of the invention using licenses in the place of incentives. This could be useful for an advertiser who merely wishes to unlock content for a user after the user has engaged the advertisement. In such a case, issuing an incentive which is redeemed as part of a purchase could be more burdensome than required. The process in FIG. 4 contains identical processing blocks as the process depicted in FIG. 3 until step 335 has been performed. At step 400, once the entertainment provider 201 has verified the metering data, the provider may generate a license related to some commercial content instead of generating an incentive. The consumer 202 then receives the license from the entertainment provider 201 at step 405, and unlocks some other file, such as a video file or executable application. This allows a user to download the file before, after or even concurrent with the advertisement activity. Alternatively, the license may allow the consumer 202 to access an online resource at step 405. These are merely examples and are not limitations of the invention.

FIG. 5 depicts an example process flow according to another embodiment of the invention. The process flow shown in FIG. 5 demonstrates an example process by which an advertiser may use transactional advertising to distribute advertising offers based on user-to-user relationships; this can be referred to as viral distribution.

FIG. 5 involves two consumers, consumer 202 and consumer 500. The process shown in FIG. 5 begins when an entertainment provider provides an advertisement offer to consumer 202 (step 505). The offer may present consumer 202 with an option to send the advertisement to another consumer. If consumer 202 chooses to send the advertisement offer to another consumer (step 510), such as consumer 500, consumer 202 may identify consumer 500 in some manner. This may be accomplished by supplying entertainment provider 201 with contact information (such as an e-mail address) for consumer 500 or by identifying consumer 500 from a contact information list. This list could be maintained with the advertiser, the entertainment provider 201 or in any other location.

Once consumer 202 has submitted consumer 500's identity or contact information in response to the advertisement offer, it may be conveyed to the entertainment provider 201. Entertainment provider 201 may then create another copy of the advertisement offer and provide it to consumer 500 (step 515). The offer may be provided to consumer 500 in any manner, including, for example, in isolation (as in by e-mail) or inserted into an entertainment stream (if consumer 500 already receives such streams from entertainment provider 201, for example). In another embodiment, consumer 202 may forward the advertisement offer directly to consumer 500 via a Peer to Peer distribution.

Once consumer 500 receives his or her copy of the advertisement offer, consumer 500 may choose whether to engage the offer. If consumer 500 engages the advertisement offer (step 520), entertainment provider 201 may distribute the corresponding advertisement to consumer 500 along with the profiled constraints on ad usage (step 525). Consumer 500 then receives the advertisement as part of an entertainment stream. If consumer 500 chooses to engage the advertisement (step 530), then metering data is created and forwarded to entertainment provider 201. Once the metering data is received by entertainment provider 201 (step 535), entertainment provider 201 may verify whether the advertisement obligations were fulfilled by consumer 500 based on the metering data (step 540), and if so, cause an incentive to be delivered to consumer 500 for viewing the advertisement (step 555) and to consumer 202 (step 550) for referring consumer 500 to the entertainment provider 201.

These incentives may be identical or different, depending on the particular advertising policy designed by the entertainment provider or advertisers involved. For example, an advertiser whose priority is enlarging its client base may desire to give any consumer that views its ad a 20% discount on the advertised product while increasing the discount to 30% for users that successfully refer another consumer to the advertiser. This, of course, may be facilitated through an auction style bid as described in FIG. 3.

Figure 8:
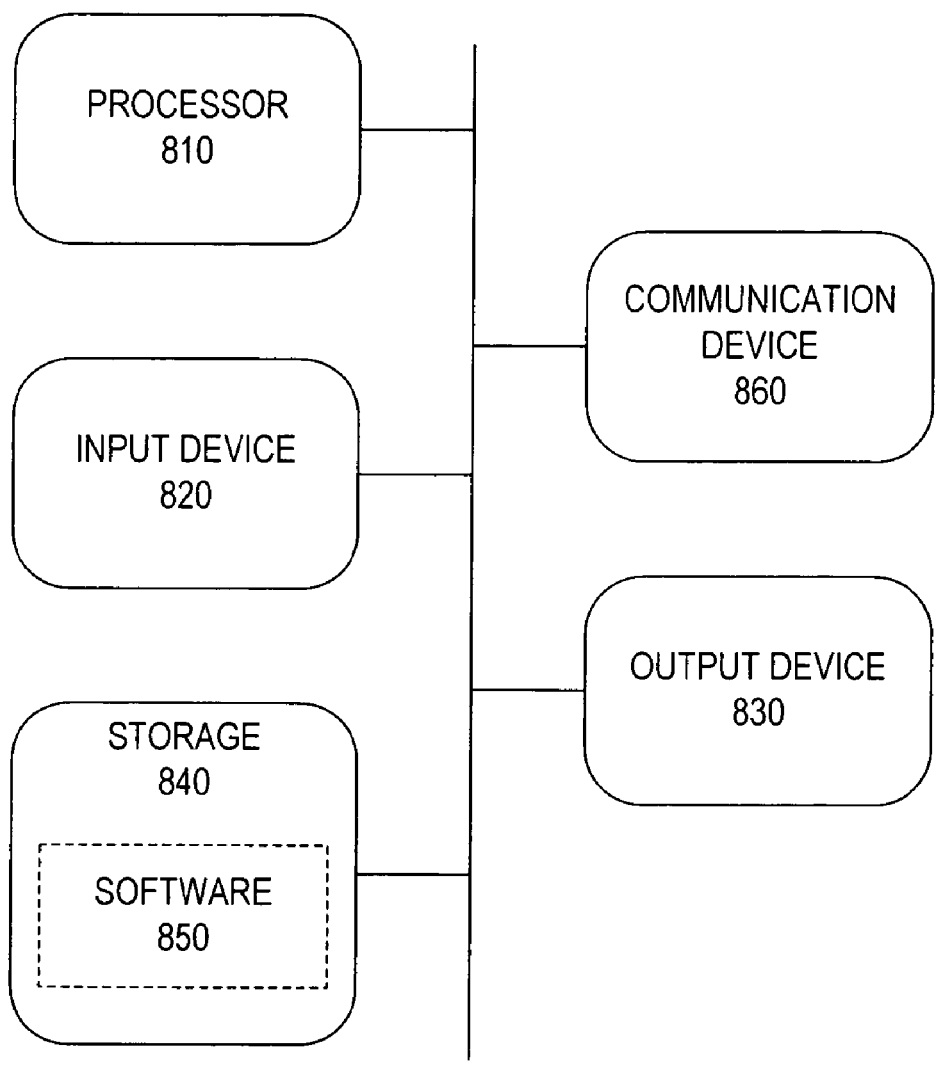
FIG. 8 is a block diagram that depicts a computing device in accordance with an embodiment of the present invention.

FIG. 8 illustrates the components of a basic computing device in accordance with an embodiment of the present invention, which may include entertainment provider 201. The computing device may be a personal computer, workstation, server, handheld personal digital assistant ("PDA"), mobile phone, set top box, other consumer electronics device, or any other type of microprocessor-based device. The computing device may include one or more of processor 810, input device 820, output device 830, storage 840, and communication device 860.

Input device 820 may include a keyboard, mouse, pen-operated touch screen or monitor, voice-recognition device, or any other device that provides input. Output device 830 may include a monitor, printer, disk drive, speakers, or any other device that provides output.

Storage 840 may include volatile and nonvolatile data storage, including one or more electrical, magnetic or optical memories such as a RAM, cache, hard drive, CD-ROM drive, tape drive or removable storage disk. Communication device 860 may include a modem, network interface card, or any other device capable of transmitting and receiving signals over a network. The components of the computing device may be connected in any manner, such as via electrical bus or wirelessly.

Software 850, which may be stored in storage 840 and executed by processor 810, may include, for example, the application programming that embodies the functionality of the present invention (e.g., as embodied in entertainment provider 201). Software 850 may include a combination of client applications and enterprise servers such as an application server and a database server.

Network 105 may include any type of interconnected communication system, which may implement any communications protocol, which may be secured by any security protocol. The corresponding network links may include telephone lines, DSL, cable networks, T1 or T3 lines, wireless network connections, or any other arrangement that implements the transmission and reception of network signals.

The computing device may implement any operating system, such as Windows or UNIX. Software 850 may be written in any programming language, such as C, C++, Java or Visual Basic. In various embodiments, application software embodying the functionality of the present invention may be deployed on a standalone machine, in a client/server arrangement or through a Web browser as a Web-based application or Web service, for example.

Several embodiments of the invention are specifically illustrated and/or described herein. However, it will be appreciated that modifications and variations of the invention are covered by the above teachings and within the purview of the appended claims without departing from the spirit and intended scope of the invention.

For example, software modules that implement the present invention such as entertainment provider 201 may comprise several discrete modules that together still provide the same functionality, data specified in the illustrated databases may be spread over several databases and/or systems, and the data and flow diagrams of FIGS. 1 and 3-5 may encompass combined steps or several intermediate steps that do not detract from the higher level functionality described therein.

What is claimed is:

1. An apparatus, comprising:
a processor; and
a memory element coupled to the processor, wherein the processor and the memory element cooperate in order to cause the apparatus to:
communicate entertainment content to a user computer in a network environment;
communicate advertising content to the user computer in response to a message communicated by the user computer;
receive metering data from the user computer, wherein the metering data indicates usage of the advertising content on the user computer;
determine, based on the metering data whether the user computer has satisfied one or more policy usage conditions for the advertising content in order to receive a financial incentive; and
deliver the financial incentive to the user computer when the one or more policy usage conditions for the advertising content are determined to have been met.

2. The apparatus of claim 1, wherein the financial incentive is an electronic data segment to be used at a uniform resource locator (URL) associated with the advertising content.

3. The apparatus of claim 1, wherein the entertainment content includes video data that is played concurrently with the advertising content being communicated to the user computer.

4. The apparatus of claim 1, wherein a profile is provided for the advertising content, and wherein the profile includes encryption information for the advertising content and a specified demographic for the advertising content.

5. The apparatus of claim 4, wherein header information is provided in conjunction with the advertising content, and wherein the header information includes a metering URL and a license acquisition URL.

6. The apparatus of claim 1, wherein the advertising content is selected from a pool of potential advertising content based on a bidding process.

7. The apparatus of claim 1, wherein the apparatus is configured for:
evaluating whether the advertising content has been communicated by the user computer to an additional computer, wherein if the additional computer satisfies the policy usage conditions, then a financial incentive is provided to both the user computer and the additional computer.

8. The apparatus of claim 7, wherein the advertising content being communicated by the user computer to the additional computer is associated with a peer-to-peer distribution activity.

9. The apparatus of claim 1, wherein the financial incentive is a license to access certain content.

10. The apparatus of claim 1, wherein the usage indicated by the metering data includes a time period that the advertising content was displayed on the user computer.

11. A method, comprising:
communicating entertainment content to a user computer in a network environment;
communicating advertising content to the user computer in response to a message communicated by the user computer;
receiving metering data from the user computer, wherein the metering data indicates usage of the advertising content on the user computer;
determining, based on the metering data whether the user computer has satisfied one or more policy usage conditions for the advertising content in order to receive a financial incentive; and
delivering the financial incentive to the user computer when the one or more policy usage conditions for the advertising content are determined to have been met.

12. The method of claim 11, wherein the financial incentive is an electronic coupon code to be used at a uniform resource locator (URL) associated with the advertising content.

13. The method of claim 11, wherein the entertainment content includes video data that is played concurrently with the advertising content being communicated to the user computer.

14. The method of claim 11, wherein a profile is provided for the advertising content, and wherein the profile includes encryption information for the advertising content and a specified demographic for the advertising content, and wherein header information is provided in conjunction with the advertising content, and wherein the header information includes a metering URL and a license acquisition URL.

15. The method of claim 11, further comprising:
evaluating whether the advertising content has been communicated by the user computer to an additional computer, wherein if the additional computer satisfies the policy usage conditions, then a financial incentive is provided to both the user computer and the additional computer.

16. The method of claim 11, further comprising:
communicating an offer to the user computer to receive the advertising content for the financial incentive, wherein the message from the user computer is a response to the offer.

17. A software program stored on a computer readable non-transitory storage device that, when executed by a processor, is operable to perform operations comprising:
communicating entertainment content to a user computer in a network environment;
communicating advertising content to the user computer in response to a message communicated by the user computer;
receiving metering data from the user computer, wherein the metering data indicates usage of the advertising content on the user computer;
determining, based on the metering data whether the user computer has satisfied one or more policy usage conditions for the advertising content in order to receive a financial incentive; and
delivering the financial incentive to the user computer when the one or more policy usage conditions for the advertising content are determined to have been met.

18. The software program of claim 17, wherein header information is provided in conjunction with the advertising content, and wherein the header information includes a metering URL and a license acquisition URL.

19. The software program of claim 17, wherein the financial incentive is an electronic message to be used at a uniform resource locator (URL) associated with the advertising content.

20. The software program of claim 17, wherein the entertainment content includes video data that is played concurrently with the advertising content being communicated to the user computer, and wherein a profile is provided for the advertising content, and wherein the profile includes encryption information for the advertising content and a specified demographic for the advertising content.

* * * * *